United States Patent

[11] 3,595,310

| [72] | Inventors | Frederick A. Burne<br>Hamden, Conn.;<br>Emery I. Valyi, Riverdale, N.Y. |
|---|---|---|
| [21] | Appl. No. | 875,661 |
| [22] | Filed | Nov. 12, 1969 |
| [45] | Patented | July 27, 1971 |
| [73] | Assignee | Olin Corporation<br>Continuation-in-part of application Ser. No. 723,339, Dec. 18, 1967, now Patent No. 3,493,042, dated Feb. 3, 1970, which is a division of Ser. No. 629,954, Apr. 11, 1967, Pat. No. 3,415,316 |

[54] MODULAR UNITS AND USE THEREOF IN HEAT EXCHANGERS
7 Claims, 13 Drawing Figs.

[52] U.S. Cl. ........................................... 165/181,
165/159, 165/162, 165/164, 165/180, 165/183
[51] Int. Cl. ........................................... F28f 1/22
[50] Field of Search ................................. 165/180,
181, 164, 183, 159, 162

[56] References Cited
UNITED STATES PATENTS

| 2,401,797 | 6/1946 | Rasmussen ................ | 165/180 X |
| 3,262,190 | 7/1966 | Rostoker et al. ............ | 165/180 X |
| 3,272,260 | 9/1966 | Raub et al. ................. | 165/164 |
| 3,306,353 | 2/1967 | Burne ........................ | 165/180 X |

FOREIGN PATENTS

| 1,313,183 | 11/1962 | France .................... | 165/180 |

*Primary Examiner*—Albert W. Davis, Jr.
*Attorneys*—Robert H. Bachman and Gordon G. Menzies ABSTRACT: A modular heat exchange unit comprising at least one impervious tube conductively bonded to a layer of porous material. The layer of porous material has an outer surface which is contoured so as to cooperatively engage at least one other such modular unit when they are assembled in a heat exchanger. The modular unit is provided with at least one resilient sealing member attached to the surface of said layer of porous material. The sealing member resiliently engages the abutting surfaces of adjacent units so as to substantially reduce bypass of the heat exchange fluid in an assembled heat exchanger. The modular units may contain more than one impervious tube, and the tubes may extend beyond the layer of porous material. In other embodiments, the layer of porous material may be shaped to fit adjacent a tubular wall, the impervious tubes may extend to at least one surface of the unit, the sealing members may be hollow or the unit may have at least one fin.

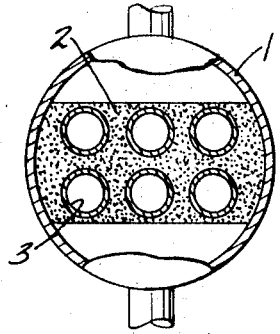
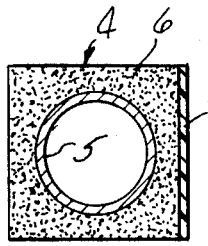
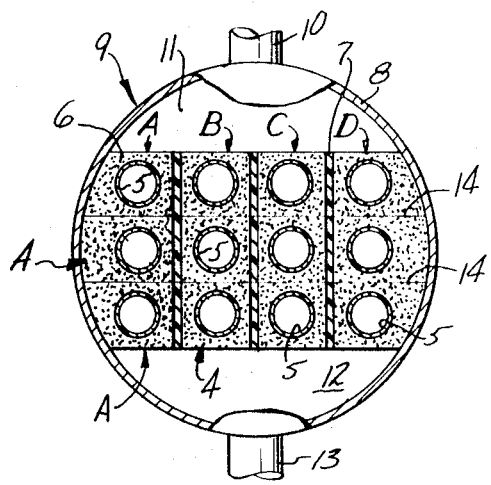
FIG-1    FIG-2    FIG-3
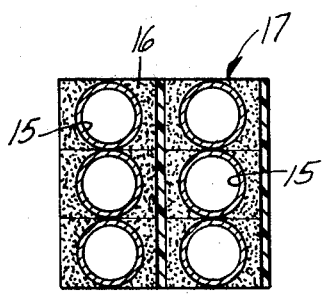
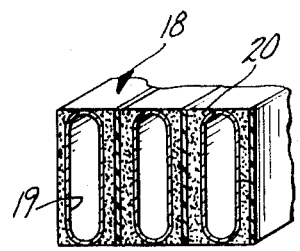
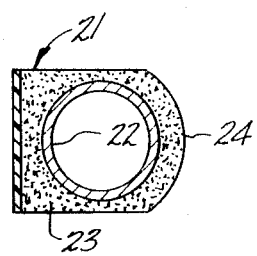
FIG-4    FIG-5    FIG-6
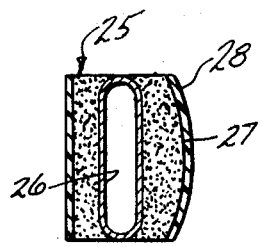
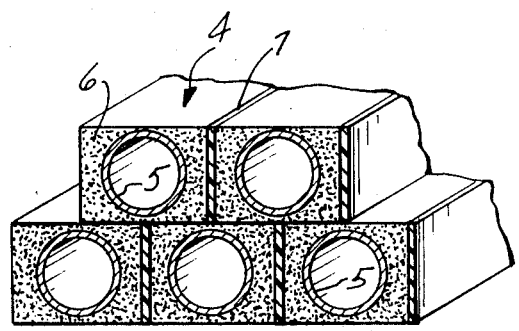
FIG-7    FIG-8
INVENTORS
FREDERICK A. BURNE
EMERY I. VALYI
BY *[signature]*
ATTORNEY

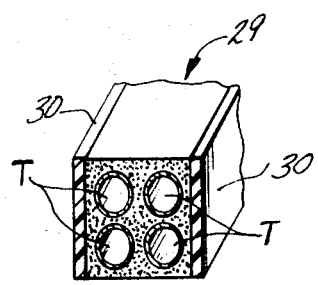
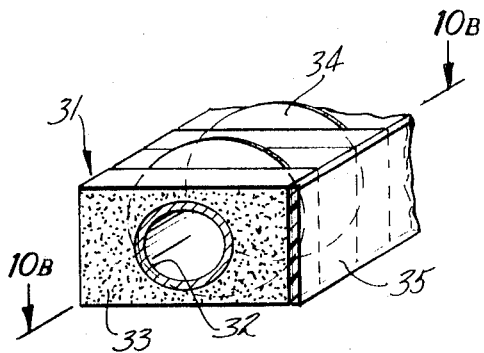
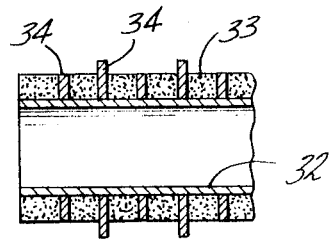
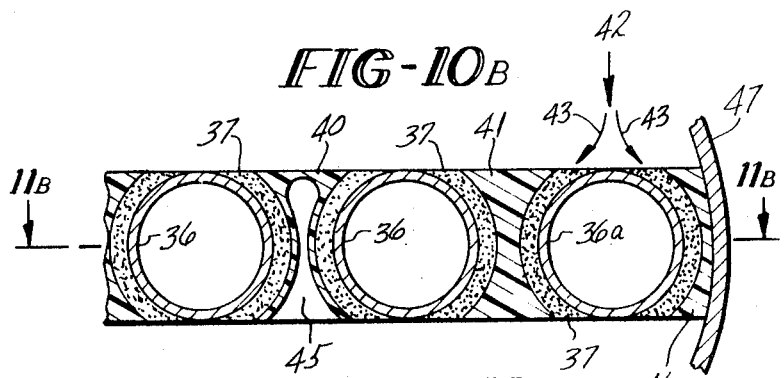
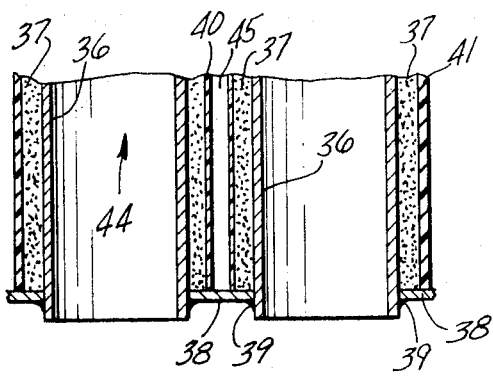
INVENTORS
FREDERICK A. BURNE
EMERY I. VALYI
ATTORNEY

MODULAR UNITS AND USE THEREOF IN HEAT EXCHANGERS

This application is a Continuation-In-Part of copending Application Ser. No. 723,339, filed Dec. 18, 1967, now U.S. Pat. No. 3,493,042, granted Feb. 3, 1970 which is in turn a division of Application Ser. No. 629,954, filed Apr. 11, 1967, now U.S. Pat. No. 3,415,316, granted Dec. 10, 1968.

This invention relates to heat exchangers and in particular, it relates to modular heat exchange units comprising tubes conductively bonded to a layer of pervious material. The layer of pervious material is contoured to engage other such units to form a heat exchanger of any desired size and length.

In making the mechanical joint between adjoining units, it is difficult to avoid bypass of the heat exchange fluid between their abutting surfaces. In accordance with this invention, bypass is minimized or eliminated by providing a sealing member between some of the abutting surfaces of the units.

FIG. 1 is a schematic sectional view of a heat exchanger according to the prior art.

FIG. 2 is a sectional view of the modular units according to the present invention.

FIG. 3 is a sectional view of the modular units shown in FIG. 2, assembled into a heat exchanger.

FIG. 4 is a sectional view illustrating the modular units with the tubes in the units abutting in a tangential fashion.

FIG. 5 is a sectional view of the modular units according to the present invention with the tubes having an elliptical cross section.

FIG. 6 is a sectional view of a modular unit according to this invention in which the contour of the modular unit is designed to fit adjacent a shell when the heat exchanger is assembled.

FIG. 7 is a sectional view of a modular unit according to the present invention designed to fit adjacent a shell, and wherein the tubes have an elliptical cross section.

FIG. 8 is a sectional view of modular units according to the present invention illustrating a staggered arrangement of the units.

FIG. 9 is a sectional view of a unit according to the present invention provided with multiple sealing members.

FIG. 10a is a sectional view of a modular unit according to the present invention provided with fins in the layer of pervious material.

FIG. 10b is a sectional view along the lines 10b–10b of FIG. 10a.

FIG. 11a is a sectional view of modular units according to the present invention provided with sealing members in the form of inserts to reduce bypass.

FIG. 11b is a sectional view along the lines 11b–11b in FIG. 11a.

It is an object of this invention to provide a heat exchanger made up of units comprising tubes conductively bonded to a layer of pervious material.

It is another object of this invention to provide modular heat exchange units which can be used in either large or small heat exchangers.

It is still another object of this invention to provide modular heat exchange units comprising tubes conductively bonded to a layer of pervious material, with the size of the units being such that uniform brazing can be obtained throughout the entire layer of pervious material in the units.

It is still another object of this invention to provide modular heat exchange units which can be brazed without the use of an unduly large furnace.

It is still another object of this invention to provide modular heat exchange units with sealing members to control the path of the heat exchange fluid passing through the pervious material to minimize bypass.

Other objects will appear from the following description and drawings. In U.S. Pat. No. 3,289,750, granted Dec. 6, 1966, and assigned to the assignee of the instant invention, heat exchanger structures are described consisting of a heat conductively bonded composite of solid and pervious metal, wherein the heating or cooling fluid is separated from the substance to be heated or cooled by an impervious barrier. Such structures have been shown to be very effective in heat transfer applications.

Figure 1 shows schematically one of such heat exchangers, very successfully produced, in which a shell 1 contains a core 2 consisting of pervious metal having tubes 3 embedded therein. Such heat exchangers are very efficient when designed within certain known dimensional limits.

Such heat exchangers are usually made by first preparing a solid metal assembly and fitting it with particulate metals with a desired size, together with a still finer brazing metal or alloy. A brazing operation follows which joins the entire structure together. In general, the resulting brazing structure contains metal particles, for example, spherically shaped, and joined by brazing. It is desired to have relatively large brazing joints to provide for good heat conduction between the metal particles. This can only be obtained if the time at brazing temperature is not too long, for example, (for a phosphorus containing copper brazing alloy, less than 5 minutes at 1,600° F.). Longer times, (e.g., more than 15 minutes at 1,600° F. for this brazing alloy) result in diffusion of the brazing alloy into the particulate metal and a considerable reduction in the size of the remaining joint area. The particular temperatures and times vary with the particular brazing alloy, but the principle is the same. The reduced area of the brazed joints results in lower heat conduction between adjoining metal particles.

The designs and schemes disclosed to date are limited to structures including an entire unit, or a core which needs only to be added for completion. The entire unit or the core must usually be small because, in the case of brazing, the center as well as the surface of the porous layer must reach brazing temperature. The brazing time must be less than it takes for harmful loss of brazing material to occur, which would result in undue loss of heat conduction from one metal particle to the other.

The size of such a one-piece unit is also limited by the brazing furnace. Considerations including atmospheric penetration, heat penetration and the total heat requirement, limit the size. One of the three linear dimensions of the one-piece units should not exceed 3 to 4 inches as a practical value. Beyond this, the atmosphere does not substantially penetrate. Weight per piece should not be too great, because an excessively long time to heat to brazing temperature would be required, or an excessively large furnace would be required. As mentioned previously, if the weight or dimensions of the unit are excessive, the time in the furnace is such that the exterior of the unit is at brazing temperature for too long a time while the interior or center is raised to brazing temperature. This reduces the cross sectional area of the brazed bond near the surface and thus causes a reduction in heat conduction at that location. The instant invention solves these problems encountered in attempting to provide one-piece units for applications involving large heat exchangers.

According to the present invention, as shown in FIG. 2, units 4 are produced containing impervious tubes 5 of desired lengths conductively bonded to a layer of porous material 6. Such elements 4 can be readily manufactured in practically unlimited lengths. For a single unit 4, the porous layer 6, which will be perpendicular to the direction of flow of the heat exchange fluid which passes through the porous material (vertically downward in Figure 3), is designed to effect an acceptable compromise between good heat transfer and low pressure drop. The thickness of the porous layer 6 will vary from one application to another. A resilient sealing member 7 is present on at least a portion of the surface of the unit 4 to reduce bypass and provide for directional flow of the heat exchange fluid when units 4 are stacked to form a heat exchanger.

The units 4 thus formed may then be mechanically assembled in a predetermined patten and put into a shell 8 of suitable size, to form a heat exchanger 9 such as the one shown schematically in Figure 3. The result would thus be similar to the structure shown in Figure 1.

To function well, substantial flow of the heat exchange fluid outside of the porous material 6 must be avoided in the assembled heat exchanger 9. Thus, if it were not for the sealing member 7, bypass of the heat exchange fluid might occur between the units where they abut, die to the lower resistance to flow at that point. Without the sealing member 7, a substantial portion of the heat exchange fluid would participate in heat exchange to a greatly reduced extent. The sealing members 7 as shown in Figure 3, assure that substantially all of the heat exchange fluid which enters the shell 8 will be in heat exchange relation with the porous material 6 by virtue of being forced to flow through that material.

Thus, in the exemplary embodiment of the present invention in Figure 3, one heat exchange fluid will enter through conduit 10, pass into the void space 11, and will then penetrate and flow through the porous material 6 as it passes downwardly through the plurality of assembled units 4. While this fluid is in contact with the porous material 6, a second heat exchange fluid, passing through the impervious tubes 5, will be in heat exchange relation with the first fluid throughout the porous material. The first heat exchange fluid will then be collected in the void space 12 and pass out at 13. It is seen that with this arrangement intimate contact is obtained between the first heat exchange fluid which enters at 10 and the porous material 6, and that substantially all of the first heat exchange fluid is in heat exchange relation with the porous material 6.

The modular units 4 may contain either single or multiple tubes 5, and can be made in long, continuous lengths Lengths of up to at least 20 feet may be produced if desired. The tubes 5 with the porous layer 6 may then be used in making either large or small heat exchangers, in a similar manner to that in which bare tube or fin tubing is presently used.

The modular heat exchanger units 4 of this invention, can be made in practically any desired length because the thickness of the porous layer 6 is such that it will fit in existing furnaces and can be effectively brazed therein. It is not difficult to braze effectively at the center, as well as the edge of the porous layer 6. Thus, it is seen that a heat exchanger employing modular units 4 of this invention, provides considerable advantage from the standpoint of flexibility of size which can be produced, as compared to the construction shown in Figure 1, which is limited to in size hereinbefore explained.

It can be seen from FIG. 3, that there is a space 14 between the impervious tubes 5 fitted with porous material 6. The heat exchange fluid which is passing vertically down through the porous material will not pass through the space 14, except to a very limited extent, and little heat will be exchanged therein. Thus, this space 14 constitutes inefficient use of the porous material 6. Thus, an improved means is shown in FIG. 4, in which the tubes 15 extend to opposing portions of the outer surface of the porous layer 16. It is apparent that, in an assembly, this design of the units 17 avoids the inefficient space 14 shown in FIG. 3.

In FIG. 3, the sealing members 7 present on the surfaces of units A, B, and C, resiliently engage the cooperating surface of modules B, C and D respectively, when the units are stacked as shown. In the embodiment of FIG. 3, modular units D do not require sealing members since their cooperating surface abuts the sealing member 7 of the adjacent units C. Between units A vertically above one another, the sealing members 7 of each unit A need not resiliently engage the sealing member 7 of the unit A below it or above it, since there will be minimal bypass of the heat exchange fluid due to flow between these resilient members A. Preferably, however, the sealing members 7 should slightly extend out from the surface of the modular unit 4 so that when the units 4 are stacked, as in FIG. 3, each sealing member 7 resiliently engages the sealing member 7 above it or below it.

The impervious tubes 5 are made of any desired cross section. For instance, the modular unit 18, shown in FIG. 5, contains impervious tubes 19 of elliptical cross section. Figure 5 also shows modular units 18 wherein the tubes extend to the surface of the porous metal layer 20 so that the units 18 are adapted to form a tangential design similar to that shown in FIG. 4.

To further avoid bypass, the units 4, which are to be placed against the shell wall 8 as shown in FIG. 3, are contoured. Thus, in FIG. 6, in the unit 21 having impervious tube 22, the porous material 23 is contoured at 24 to fit against a shell wall 8 as in FIG. 3. Likewise, the unit 25, as in FIG. 7, having elliptical tube 26, is contoured at 27 to fit against such a shell wall 8 as in Figure 3. In the preferred embodiment, the contoured surface 27 which abuts the shell wall 8, in Figure 3, has the resilient sealing member 28 on it for engaging the surface of the shell wall 8.

Figure 8 shows the use of modular units 4 in accordance with this invention having sealing members 7 on at least one surface, wherein the units 4 are stacked in a staggered arrangement. In this embodiment, bypass is held to a particularly low level, since both the sealing members 7 and the staggered configuration, act to reduce bypass of the heat exchange fluid. Thus, in the embodiment shown in FIG. 8, the units 4 comprise impervious tubes 5 conductively bonded to pervious material 6. These units 4 are separated by sealing members 7 which are in the form of strips 7. Furthermore, the rows of units 4 spaced apart by the strips 7 are in a staggered relationship with the center of the strip 7 of one row being in line with the center of the tube 5 of the row above it or below it.

In this invention, each modular heat exchange unit is provided with a sealing member at all places along which bypass is to be prevented. The sealing member may be in the form of a strip or layer 7, as shown in FIG. 2, or in the form of an insert 40 or 41, as shown in FIG. 11a.

The sealing member may consist of thin gage soft metal, plastic, rubber, paper, cardboard, or other suitable material which will be compatible with the heat exchange fluid and the temperatures employed. Exemplary of the range of materials that can be used are the following:

Acrylonitrile-butadiene copolymers (Buna N), for petroleum-based fuels and oils;

Butadiene-styrene -styrene copolymer (Buna S), for brake fluid, etc.;

Isolbutylene and isoprene copolymer (butyl rubber), for mild acids, phosphate ester hydraulic fluids;

Polyacrilate-acrylic ester polymers, for hot oils, up to 350° F.;

Polysulfides, for petroleum based fuels and oils;

Ethylene-propylene rubbers, for acids, alkalis, phosphate ester fluid;

Polyurethane rubber, for fuel and oil;

Silicone polymers, for very low and very high temperature extremes;

Fluorosilicone polymers, for petroleum base fuels, lubricants, synthetic lubricants in a range of −100° to 350° F.;

Hexafluoropropylene and vinylidene fluoride copolymers, for service up to 450° F. (intermittently up to 600° F.), with good chemical resistance;

Felt, i.e. wool felt, plain, laminated, either natural or impregnated, for water, air, noncorrosive gases;

Dacron, nylon, or cotton fabric, alone or from mixed yarn, for water;

Asbestos fiber, for hot gases;

Rubber asbestos compositions, for water;

Cork, cork-and-rubber, the rubber being nitrile-chloroprene styrene-butadiene, nitrile-butadiene, chloroprene, butyl, for water;

Natural rubber for water;

Sealants and adhesive sealants (polysulfide, polyurethane, silicone, neoprene, hypalon, epoxy, acrylic, polyester, butyl, polybutene, oleo-resin, asphalt and bituminous), for medium temperature oils;

Paper, creped kraft, rope-fiber, glass-fiber reinforced cloth for low temperature dry gases;

Still other materials can be used such Fluorocarbons;

Leather and poromeric materials (Corfam);

Metals in a soft state, e.g. lead, soft annealed copper, etc.

Still other materials can obviously be used.

While the sealing materials set forth above have been listed with reference to use with specific heat exchange fluids, they are not limited thereto, but can be used with any heat exchange fluid which will not react with them or degrade their properties. It is also important that the material used in the sealing member be chosen so that it will not contaminate the heat exchange fluid.

It is essential that whatever material is chosen, the member itself must be resilient so that the sealing member will engage the abutting porous surfaces of the units and prevent bypass. The sealing member may be provided with a contact adhesive layer for easier application. Thus, a roll of sealing member material may be provided in the manner of an adhesive strip roll. The requisite amount of the sealing member strip may then be attached to the element immediately prior to assembly. Alternately, the elements may be so equipped in the course of manufacture, thereby assuring that the right orientation in the assembly is observed.

In FIG. 9, there is shown a unit 29 in accordance with this invention, wherein a sealing member 30 is present on opposite sides of the porous surface. Using this approach, makes it possible to construct a heat exchanger 9 as in FIG. 3 by alternately placing the units 29 in accordance with FIG. 9 adjacent to plain units having no sealing member 30 on their surface. The unit 29 also contains a plurality of impervious tubes T.

In another embodiment of this invention, shown in FIGS. 10a and 10b, the units 31 have tubes 32. Bonded to the tubes 32 is porous material 33. However, the tubes 32 also have fin members 34. These fin members 34 are conductively bonded to the porous material 33 and to the tubes 32. The fins 34 may be placed below the surface of the porous material 33, or they may extend to the surface, or above the surface, as desired. This embodiment results in more efficient heat transfer due to the combined effects of the porous material 33 and the fins 34. As in the previously described units 4 a sealing member 35 is also provided.

In the embodiment shown in FIGS. 11a and 11b, the tubes 36 are embedded in porous material 37 and so bonded as to provide heat transfer and conductance from one to the other. A series of such tubes are then placed in tube headers 38 and sealed conventionally at 39. Sealing member inserts 40 and 41 made from material as aforenoted, are placed between the tubes 36, thus forcing the fluid flowing in the direction of arrow 42 to flow as indicated by arrows 43. The second heat exchange fluid flows inside the tubes in the direction of arrow 44. Flow of the heat exchange fluids in this structure may be arranged so as to be parallel of in series, or in series and parallel depending on the designer's choice. Open inserts 40 having void space 45 or closed inserts 41 may be used. Inserts 46 similar to inserts 40 and 41 may be used between end tubes 36a and the inner shell wall 47. The porous layer 37 may surround the tubes 36 fully or partially so long as the inserts 40, 41, and 46 are formed to provide flow through the entire porous layer 37.

While the invention has been described with reference to modular units having a single impervious metal tube, it is equally applicable to units having a plurality of tubes. A variety of metals are useful for the impervious tubes and the pervious material including copper, copper alloys, aluminum, aluminum alloys, iron and iron alloys to name a few.

It is to be understood that the invention is not limited to the illustration described and shown herein, which are deemed to be merely illustrative of the best modes of carrying out the invention, and which are suitable of modification of form, size, arrangement of parts and details of operation. The invention rather is intended to encompass all such modifications which are within the spirit and scope of the claims.

What we claim is:

1. A modular heat exchanger unit comprising at least one tube heat conductively bonded to a layer of porous heat conductive material, said layer of porous material having an outer surface contoured so as to cooperatively engage at least one other such modular unit when assembled in a heat exchanger, said unit being provided with at least one resilient sealing member attached to the surface of said layer of porous material so as to substantially reduce bypass of the heat exchange fluid when said unit is cooperatively engaged with said at least one other unit, said porous material substantially covering said tube in contacting relationship.

2. A modular unit according to claim 1 wherein said unit contains more than one tube.

3. A modular unit according to claim 1 wherein the contour of the surface of the layer of porous material is shaped to fit adjacent a tubular wall.

4. A modular unit according to claim 1 wherein the tube part extends beyond the layer of porous material.

5. A modular unit according to claim 1 wherein said sealing member is hollow.

6. A modular unit according to claim 1 wherein the tube extends to at least one surface of the unit.

7. A modular unit according to claim 1 wherein the unit has at least one fin.